United States Patent [19]

Cecchin

[11] 3,887,938

[45] June 3, 1975

[54] IC COLOR DEMODULATOR WITH SINGLE EXTERNAL PICTURE CONTROL

[75] Inventor: Gildo Cecchin, Niles, Ill.

[73] Assignee: Motorola, Inc., Chicago, Ill.

[22] Filed: Mar. 18, 1974

[21] Appl. No.: 452,240

[52] U.S. Cl. .................................... 358/27; 358/23
[51] Int. Cl. ........................................... H04n 9/535
[58] Field of Search .................... 358/21, 23, 25, 27

[56] References Cited

UNITED STATES PATENTS

| | | | |
|---|---|---|---|
| 3,660,598 | 5/1972 | Theodoulou | 358/23 |
| 3,715,463 | 2/1973 | Matzek | 358/27 |
| 3,755,619 | 8/1973 | Lovely et al. | 358/27 |
| 3,813,686 | 5/1974 | Mierzwinski | 358/27 |

*Primary Examiner*—Richard Murray
*Attorney, Agent, or Firm*—Vincent J. Rauner; Maurice J. Jones, Jr.

[57] ABSTRACT

An improved color demodulator circuit arrangement for a color television receiver. The demodulator is preferably in integrated circuit form and includes separate current steering devices for controlling the level of liminance and chrominance signal information as translated thereby. The attenuators in turn are controlled by a single master picture control in the form of a potentiometer external to the integrated circuit. In this way, contrast and chroma levels are effectively controlled simultaneously and in complimentary fashion. A unique black level clamping arrangement is included to maintain brightness at a substantially fixed level notwithstanding a change in contrast level. This is accomplished by blocking out the d-c component of the luminance signal and charging a control element to a fixed d-c level during horizontal retrace intervals.

In another embodiment a light dependent resistance element is coupled to the current steering devices which simultaneously controls the luminance and chrominance signal levels in accordance with ambient light level.

15 Claims, 6 Drawing Figures

IC COLOR DEMODULATOR WITH SINGLE EXTERNAL PICTURE CONTROL

BACKGROUND OF THE INVENTION

The present invention relates in general to television circuitry, and more particularly to an improved color demodulator arrangement in integrated circuit form which includes a single external master control for effecting viewer preferred picture adjustments, either manually or automatically in reference to ambient lighting conditions.

The NTSC standards presently adopted in the United States for color television requires a composite video signal which, inter alia, includes both a luminance and a chrominance component. The television receivers adapted to translate the standardized color signal customarily employs a plurality of controls to adjust the various operational characteristics of the reproduced image on somewhat of a subjective basis. Such plurality of controls which affect picture presentation includes a contrast control, a brightness control, a hue or tint control and a saturation or color intensity control. As is known, the tint control varies the hue or color tint of the reproduced images and has a capability of varying fleshtones throughout a range varying from essentially a purplish cast to one of a greenish cast. The saturation or intensity control of course controls the level of color in the reproduced image. The contrast control varies the luminance component of the composite video for obtaining the proper gradation between black and white levels, whereas the brightness control varies the average brightness or background of the image being displayed.

As is also known, the action of these controls is not entirely independent of one another. In some instances, a change in one necessarily effects a change in another. For example, changing the contrast also effects a change, often undesired, in the brightness level. This is because the luminance component of the composite video signal, in addition to containing an alternating current (a-c) component, also includes a direct current (d-c) component. Changing the signal level, or a-c gain, to change contrast, necessarily changes or unbalances the d-c component as well, which of course effects a change in brightness level.

At the same time, changing either the contrast or brightness level more often than not results in an apparent change in the color intensity level because the subjective color values do not remain the same. What was previously portrayed in sufficiently saturated or vivid colors will then appear in the pastel range. The apparent desaturation of colors results from the increase of white light arising from an increase in the average picture brightness level. Accordingly, suitable adjustments in the various referenced picture controls are in order to re-establish the optimum or at least preferred parameters in the picture presentation. However, this interaction and readjustment requirements are often quite bothersome if not entirely confusing to the user.

In addition, it will be appreciated that a change in ambient lighting conditions often result in a less than optimum quality of the image being reproduced. What is deemed a proper setting, say for example in nighttime viewing, appears much too dark for daylight conditions. An increase in both contrast and color intensity will more often than not be required. In some instances, a change in brightness may also be preferred. Conversely, a picture set for optimum viewing under daylight conditions subjectively appears much too bright for nighttime conditions and suitable changes in at least the contrast and color intensity are in order. In any event, additional picture control adjustments are called for by the user.

Accordingly, an object of the present invention is to provide an improved color demoldulator arrangement in integrated circuit form wherein the foregoing deficiencies are effectively overcome.

A more particular object of the present invention is to provide an improved color demodulator arrangement in integrated circuit form for television application wherein a single external control, such as a potentiometer, is utilized to vary both contrast and color intensity levels simultaneously while brightness level is held substantially fixed.

Another object of the present invention is to provide an improved color demodulator arrangement of the foregoing type wherein a light dependent resistor, or other component responsive to ambient lighting conditions, is utilized to vary both chroma and contrast automatically in accordance with light level changes.

Still another object of the present invention is to provide an improved color demodulator arrangement of the foregoing type wherein a novel d-c restoration circuit maintains brightness level substantially fixed notwithstanding a change occurring in the luminance signal which in turn may unbalance the d-c component thereof.

SUMMARY OF THE INVENTION

Briefly, the invention contemplates a color demodulator arrangement expecially suited to color television application. The demodulator preferable is in integrated circuit form and includes both a luminance channel and a chrominance channel in addition to the three color demodulators themselves. Each of the luminance and chrominance signals fed to the demodulator circuit are in turn applied to respective current steering attenuators in a differential amplifier configuration. A single master control, external to the integrated circuit, and in the form of a conventional potentiometer, controls the signal level through the steering attenuators so that both the luminance and chrominance signals are varied simultaneously. This means that both contrast and color level or intensity track with respect to one another in all instances and, of course, may be effectively controlled by a single viewer-operated control or potentiometer.

Notwithstanding the fact that a change in luminance (contrast) necessarily varies or unbalances the d-c component thereof, which would otherwise affect brightness level, the latter remains substantially unaffected and remains at a relatively fixed magnitude by reason of a novel d-c restoration circuit arrangement. A blocking capacitor is utlized, and which is effectively clamped at a selectively predetermined level during the horizontal blanking interval. A positive-going horizontal blanking pulse is placed in substantial time-coincidence with the sync and blanking portion of a derived negative-going composite video signal. This permits the clamping action to take place on the most positive level of the composite signal which will always be the blanking component as compared to the sync component. The former, of course, corresponds to the cutoff the image reproducer tube and is the desired control action.

A further feature of the invention in one embodiment is the addition of a light dependent resistance or like component which may be used to control the bias voltage to the respective current steering attenuators. In this manner, both contrast and color intensity, or more properly, luminance and chrominance, are varied simultaneously, but in this instance, automatically, in response to changes in the ambient light level.

While an illustrated embodiment of the invention is set forth herein, and which will be described in detail, the invention is susceptible of the embodiment in many different forms, and it is to be understood that the present disclosure is merely an exemplification of the principles of the invention and is in no way intended as a limitation.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, and the several figures, of which like numerals identify like elements, in which:

DESCRIPTION OF A PREFERRED EMBODIMENT

Figure 1:
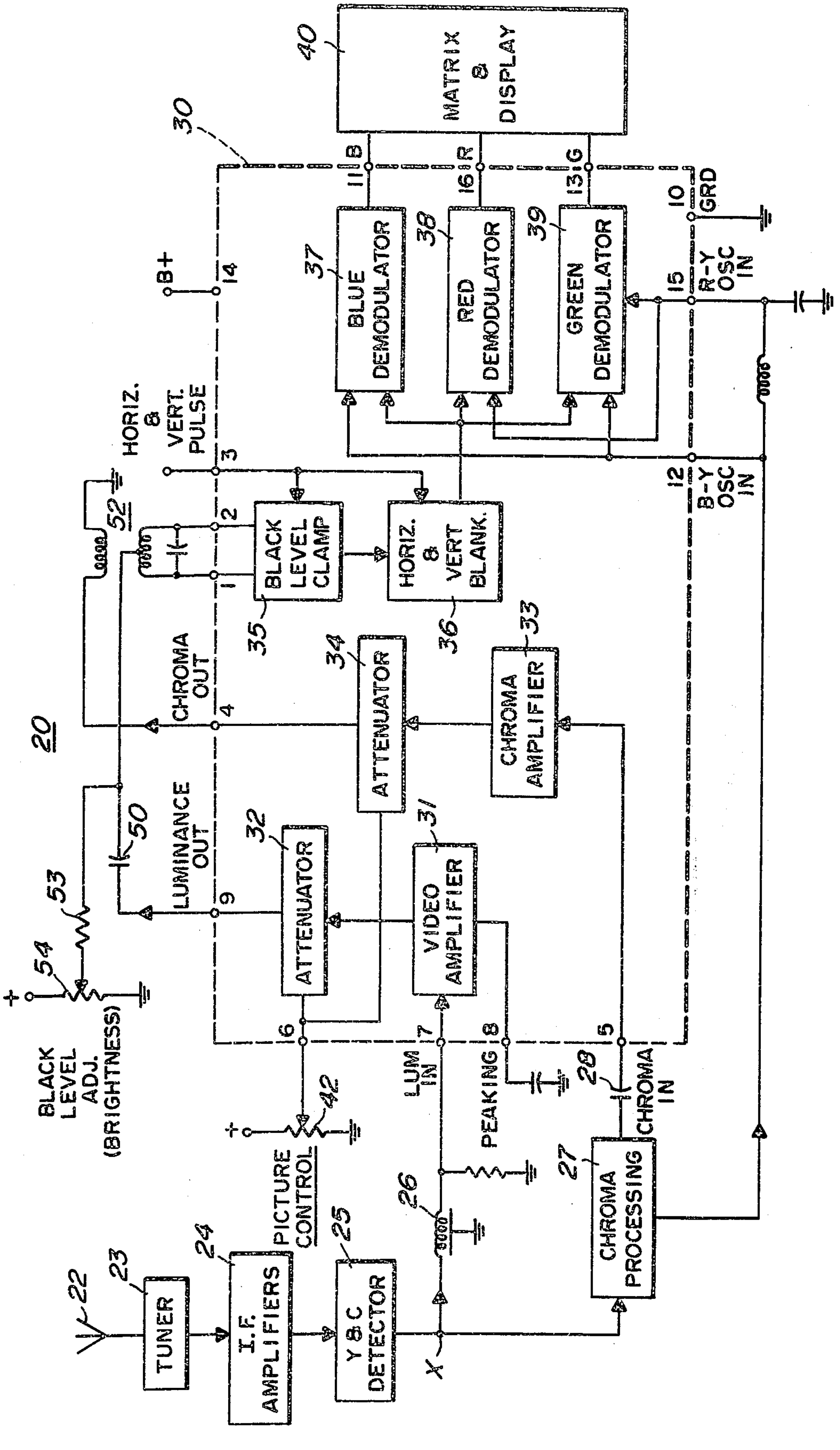
FIG. 1 is a block diagram of a portion of a television receiver, including color demodulator, which has been constructed in accordance with the present invention.

Referring now to the drawings, a color television receiver 20 is shown substantially in block diagram form, which receiver further includes a color demodulator arrangement, preferably in integrated circuit form, as shown in dotted line at 30. It will be appreciated that only that portion of the television receiver 20 as shown in FIG. 1 is necessary so as to place the operation of the demodulator 30 in its proper perspective. It is the color demodulator 30 that embodies the principles of the present invention.

As will be understood in the art, television signals received by an antenna 22 are applied to a tuner arrangement, indicated generally at 23, which, inter alia, converts the signal to the proper intermediate frequency. The converted signal, after being amplified by suitable IF amplifiers 24, is applied to a luminance (Y) and chrominance (C) detector, indicated at 25. The output of detector 25 is a composite video signal CV (see FIG. 6) which includes various information, including video or luminance components as well as chroma information. The chroma information is suitably extracted by a chroma processing arrangement as shown at 27, in a known manner.

As thus far described, the operation of receiver 20 is entirely conventional such that further and more detailed explanation should not be necessary. Attention may now be drawn to the color demodulator 30 embodying the present invention.

As indicated, demodulator 30 includes a luminance channel, comprising amplifier 31 and an attenuator 32, and also a chrominance channel, comprising an amplifier 33 and an associated attenuator 34. The demodulator 30 further includes a black level clamp 35, a horizontal and blanking arrangement 36 and three separate color demodulators 37, 38 and 39, respectively, as shown. These demodulators, in the presence of suitable reference signals, provides an output of conventional red, blue and green color signals suitable for further application to a matrix and display arrangement 40 in the manner well known in the art.

As will be noted, color demodulator 30 preferably is provided as an integrated circuit in monolythic form with some 16 access terminals. In operation, the composite video signal which includes video or luminance information is applied through access terminal 7 to the amplifier 31. The output thereof may be coupled to attenuator 32 and, from there, to access terminal 9, forming the luminance output, as indicated. Similarly, chroma information, from processing circuit 27, is applied through coupling capacitor 28 and input access terminal 5 to amplifier 33, the output of which is coupled to attenuator 34, and from there to the chroma output at access terminal 4. A single control, in the form of a potentiometer 42, provides a d-c bias voltage to attenuators 32 and 34 in common so as to control the amplitude of both the luminance and chrominance signals simultaneously, and in complimentary fashion.

Without more, however, it will be realized that a change in the magnitude of a luminance signal will necessarily affect the brightness level as well as the desired contrast level. This is because the luminance signal has an a-c component, corresponding to contrast level, as well as a d-c component, the latter affecting brightness. Changing contrast has usually required a change in brightness level as a result of the interdependence there between, and vice versa.

This undesirable shift in brightness level with changing contrast level, however, does not occur in the receiver 20 as constructed in accordance with the present invention. This is because of the black level clamping arrangement employed therein and as identified generally at 35. Notwithstanding an unbalance with respect to the d-c component is affected in the luminance signal along with the change in the a-c component or contrast control, the brightness level remains the same. This is accomplished by clamping a composite video signal at the blanking level, which level is made to correspond to the cutoff of the image reproducer, (not shown) and thus corresponds to black level. This clamping action is made to occur regardless of the d-c level present for the luminance signal. Hence, brightness level remains the same regardless of the change in contrast level.

Figure 4:
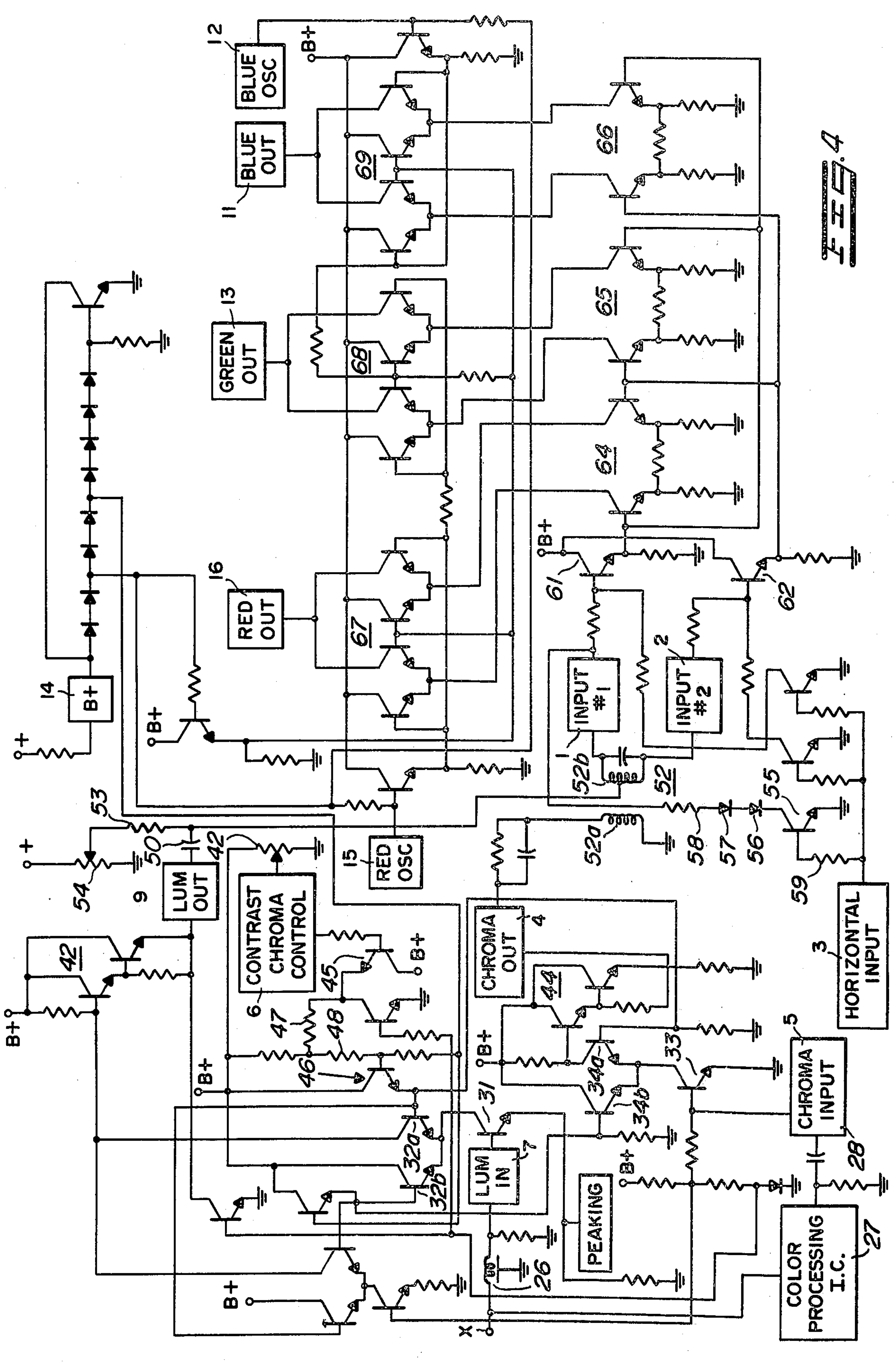
FIG. 4 is a more complete schematic diagram of the color demodulator arrangement as a whole.

The schematic representation for the color demodulator 30 is shown in some detail in FIG. 4. The output from video detector 25 at terminal X is applied through delay line 26 to input access terminal 7, and from there to transistor amplifier 31. The output of amplifier 31 is applied to the junction of the emitter electrodes for a pair of transistors 32*a* and 32*b*, serving as the current steering attenuator 32. The output of attenuator 32 is taken at the collector of transistor 32*a* and is applied through an emitter follower amplifier arrangement 42, and from there to the luminance output access terminal 9.

At the same time, the composite video signal at terminal X is also applied to the color processing arrangement 27 where the chroma signal information is derived and applied through coupling capacitor 28 to the chroma input access terminal 5. The chroma information is coupled to the transistor amplifier 33 and from there to the junction of the emitter electrodes of a pair of transistors 34*a* and 34*b*, forming the current steering attenuator 34 as depicted in FIG. 1. The output is taken at the collector of transistor 34*a* and is applied through an associated emitter follower amplifier arrangement 44, and from there to the chrominance output access terminal 4.

It will be noted the signal information through the respective current steering attenuators 32 and 34 is selectively controlled by the setting of the external potentiometer control 42. The movable arm thereof is electrically connected to contrast/chroma access terminal 6, and from there through emitter followers 45 and 46 and serially connected resistances 47 and 48 to the base of transistors 32*a* of attenuator 32, and also to the base of transistor 34*a* of attenuator 34. As indicated, the input-bases of transistors 32*b* and 34*b* are tied to a source of reference potential. Accordingly, the respective signals as translated through attenuators 32 and 34 are selectively but simultaneously controlled by the setting of potentiometer 42.

Figure 2:
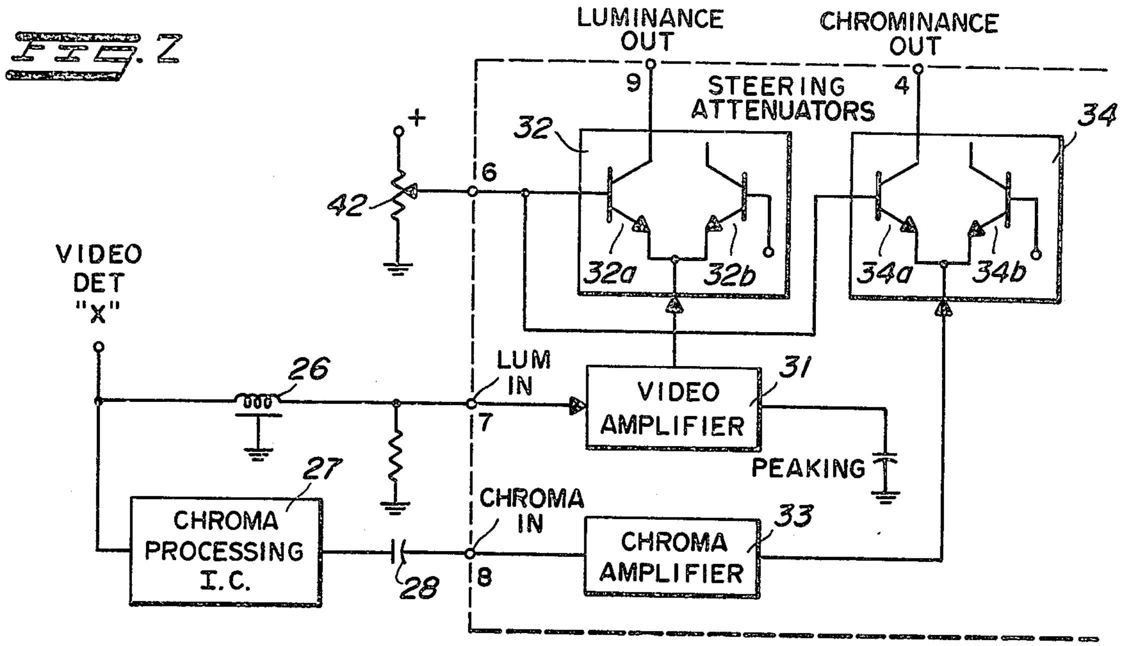
FIG. 2 is a partial schematic and block diagram of the receiver as shown in FIG. 1 which exemplifies the simultaneous control of the chrominance and luminance signals by a single, external, master control.

This can be more easily appreciated by reference to FIG. 2. With the respective bases of transistors 32*b* and 34*b* tied to a reference potential, the setting of potentiometer 42 determines the bias voltage as applied to the respective bases of transistors 32*a* and 34*a*, in common. As the d-c voltage developed at access terminal 6 becomes progressively higher than the reference voltage as applied to the bases of transistors 32*b* and 34*b*, the level of signal information steered thru transistors 32*a* and 34*a* becomes progressively greater, at least until the transistors reach their effective saturation level. The reverse, of course, is true as the bias voltage developed by potentiometer 42 falls below the level of reference voltage applied to transistors 32*b* and 34*b*. In any event, it will be seen that the level of luminance and chrominance signals, appearing respectively at access terminals 9 and 4, are selectively controlled simultaneously and in complimentary fashion.

Referring again to FIG. 4, the black level clamp arrangement 35, as shown in FIG. 1, includes a d-c blocking capacitor 50 interconnected between output access terminal 9 and the center tap of winding 52*b* of transformer 52. Capacitor 50 is also connected thru a resistance 53 to the movable contact arm of a potentiometer 54. The fixed terminals potentiometer 54 are interconnected between a source of potential and ground. To complete the circuit arrangement, a further transistor 55 is provided having its emitter connected to ground and its collector coupled to winding 52*b* as shown through a pair of diodes 56 and 57, and a resistance 58.

In operation, the luminance signal is applied through capacitor 50 and transformer winding 52*b* to each of the input access terminals 1 and 2, and from there through transistors 61 and 62, respectively, to associated demodulator gate circuits, identified generally at 64, 65 and 66. The output of each of these gates is coupled to a respective one of the demodulators themselves, as identified at 67, 68 and 69, respectively. The chroma information is likewise coupled to the respective ones of the gating circuits 64, 65 and 66, but in this resistance by transformer action through windings 52*a* and 52*b*. At the same time, horizontal pulses are applied to the input base of transistor 55 through horizontal input access terminal 3 and series resistance 59.

Figures 3, 5, 6:
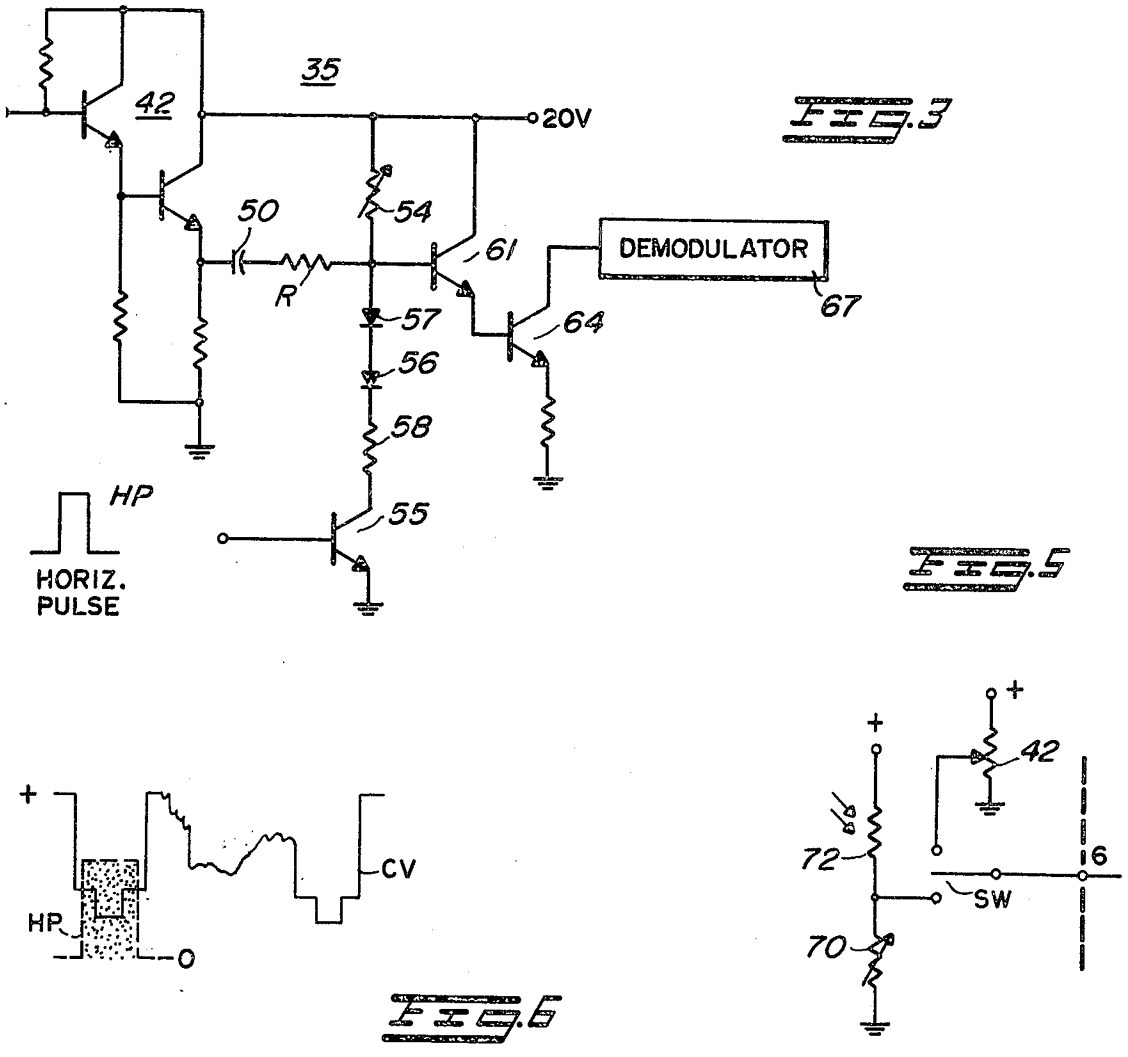
FIG. 3 is a partial schematic and block diagram of still another portion of receiver as shown in FIG. 1 which exemplifies the unique d-c restoration arrangement utilized therein.
FIG. 5 is a partial schematic showing the addition of a light responsive element for automatically controlling certain parameters of the color demodulator as shown in FIG. 4.
FIG. 6 is a graphic representation of the horizontal blanking pulse overlying a portion of the composite video signal which is useful in understanding certain aspects of the d-c restoration arrangement as shown in FIG. 3.

The clamping action of circuit 35 may be more readily appreciated by reference to the somewhat simplified schematic as shown in FIG. 3. Like reference symbols identify like components in all instances. As will be appreciated, the luminance signal from amplifier stage 42 is applied through coupling capacitor 50, a resistance R and transistors 61 and 64, to the referenced demodulator 67. As mentioned previously, the operation of luminance amplifier 42 necessarily results in an unbalance or change in the d-c component in the luminance or composite video information. The d-c component, however, is effectively rejected or blocked by capacitor 50. During the horizontal blanking interval, transistor 55, upon a horizontal pulse HP being applied thereto, is driven into saturation and thus capacitor 50 is clamped at some fixed d-c level as determined by the voltage drops of the two diodes 56 and 57 and resistances 58 and R. In practice, the clamping level is on the order of 1.7 volts.

An important aspect of the circuit arrangement 35 is that the clamping action takes place with a negative-going composite video signal CV and a positive-going horizontal pulse HP, as depicted graphically in FIG. 6. The horizontal pulse HP is arranged to be in substantially time-coincidence with the sync and blanking pedestal of the composite video signal CV. The width of the pulse HP is made to be somewhat less than the width of the pedestal of the composite video signal as a whole, but at the same time, somewhat wider than just the sync portion thereof. As a consequence, the clamping action takes place on the most positive portion of the composite video signal CV, which in all instances will be the blanking level portion thereof rather than the sync information. Black level remains fixed at all times and the luminance signal may be varied at will to change contrast without substantially affecting brightness level.

If a change in brightness level is desired, the same is effected by changing the setting of potentiometer 54. Potentiometer 54, external to the demodulator integrated circuit 30, varies the charging currents which in turn changes the effect of biasing on the demodulator arrangement, such as shown at 67. The result is a change in the brightness level as seen by the viewer. The inclusion of resistance R, FIG. 3, reduces the effect of charging currents and correspondingly reduces the percentage of d-c coupling. The higher the resistance of resistor R. the less d-c coupling.

Lastly, it is to be noted that the change in contrast and chroma levels may be effected automatically with varying ambient lighting conditions, as depicted in the partial schematic diagram of FIG. 5. A single pole, double throw switch SW may be utilized as to selectively interconnect, in one position, the previously described external, but manually adjustable master control potentiometer 42 to demodulator integrated circuit access terminal 6 so as to control manually the contract and chroma levels simultaneously but in complimentary fashion. In the remaining position, switch SW may be used to connect the additional resistances 70 and 72 to the access terminal 6. In this instance, however, resistance 72 is of the type which exhibits a level of resistance in accordance with the intensity of light impinging thereon. That is, it is a light dependent resistance device but known in the art. In any event, the higher the light level impinging on resistance 72, the lower the exhibited resistance and the higher the bias voltage developed at access terminal 6. which, in turn, progressively raises the luminance (contrast) and chroma levels within the demodulator circuit 30. As the ambient light level drops, resistance 72 increases in value, thereby lowering the bias voltage and, in turn, the contrast and chroma levels. Resistance 70 is included so as to limit the range of change observed between lighting extremes to a predetermined value.

Accordingly, what is claimed is:

1. In a color television receiver having a source of composite video signal information and also a source of chroma signal information, an improved color demodulator arrangement, including in combination:

a plurality of demodulators for deriving respective color signals;

first amplifier means for amplifying the composite video signal and applying the same to first attenuator means for controlling the level of luminance signal as translated thereby;

second amplifier means for amplifying the chroma signal and applying the same to a second attenuator means for controlling the level of chrominance signal as translated thereby;

adjustable resistance means coupled to said first and second attenuators in common, the setting of which determines the level of luminance and chrominance signal information translated thereby simultaneously and in complimentary fashion; and black level clamping means for effecting a fixed bias to said demodulators in response to the blanking level of the composite video signal and regardless of the magnitude of the d-c component in said luminance signal as translated by said first attenuator means.

2. An improved color demodulator arrangement in accordance with claim 1 wherein said attenuators are in the form of current steering devices, each of which includes a pair of transistors connected in differential amplifier configuration and wherein said adjustable resistance means selectively steers said luminance signal and said chrominance signal through respective transistors of said differential amplifier current steering devices.

3. An improved color demodulator arrangement in accordance with claim 2 wherein each of said first and second amplifiers is in the form of an additional transistor amplifier having a base-input and a collector-output connected to the emitter junction point of a respective one of said differential amplifier current steering devices.

4. An improved color demodulator arrangement in accordance with claim 2 wherein said adjustable resistance means provides a manually selectable d-c bias to a respective transistor in each of said transistor pairs of said differential amplifier current steering devices.

5. An improved color demodulator arrangement in accordance with claim 1 wherein said black level clamping means includes a d-c blocking element at the output of said first amplifier and wherein said element is charged to a fixed, predetermined level during horizontal retrace interval in the composite video signal.

6. An improved color demodulator arrangement in accordance with claim 5 wherein said d-c blocking element is a capacitor interposed between the output of said first amplifier means and said plurality of demodulators, and wherein said capacitor is charged to said fixed d-c level by a further transistor having its collector-emitter circuit interconnected to a plane of reference potential through a serially connected resistance and pair of diodes, said last name transistor being driven into saturation during each horizontal retrace interval.

7. An improved color demodulator arrangement in accordance with claim 6 wherein the composite video signal at the output of said first amplifier means is a negative-going signal and wherein said further transistor is driven into conduction by a positive-going control signal in substantial time-coincidence with the horizontal retrace of interval said composite video signal.

8. An improved color demodulator arrangement in accordance with claim 1 wherein said plurality of demodulators, said first and second amplifier means, said attenuators and said black level clamping means are all disposed in a single integrated circuit and wherein said adjustable resistance means is provided as a separate external control thereto.

9. In a color television receiver having a source of composite video signal information and also a source of chroma signal information, an improved color demodulator arrangement, including in combination:

a plurality of demodulators for deriving respective color signals;

first amplifiers means for amplifying the composite video signal and applying the same to first attenuator means for controlling the level of luminance signal as translated thereby;

second amplifier means for amplifying the chroma signal and applying the same to second attenuator means for controlling the level of chrominance signal as translated thereby;

manually adjustable resistance means for connection to said first and second attenuators in common so as to selectively and simultaneously control the level of luminance and chrominance signals as translated thereby;

light dependent resistance means for connection to said first and second attenuators in common so as to control automatically the luminance and chrominance signal levels as translated thereby in accordance with and in response to ambient light level; and black level clamping means for effecting a fixed bias to said demodulators in response to the blanking level of the composite video signal and regardless of the magnitude of the d-c component in said luminance signal as translated by said first attenuator means.

10. An improved color demodulator arrangement in accordance with claim 9 wherein switching means are included to selectively interconnect said manually adjustable resistance means and said light dependent resistance means to said first and second attenuators in common.

11. An improved color demodulator arrangement in accordance with claim 10 wherein said plurality of demodulators, said first and second amplifier means, said attenuators and said black level clamping means are all disposed in a single integrated circuit and wherein said manually adjustable resistance means, said light dependent resistance means and said switching means are provided as separate, external components thereto.

12. An improved black level clamping arrangement for a color television receiver having a source of composite video information comprised of an a-c component, and a d-c component, and further having a source of fly back pulse information at the horizontal frequency rate, said clamping arrangement including in combination;

d-c blocking means at the output of said luminance amplifier for blocking the d-c component of the composite video while effectively passing the a-c component thereof; and means, including gating means, for receiving said horizontal fly back pulses and effecting a charge on said d-c blocking means at a fixed, predetermined d-c level during the horizontal retrace interval of the composite video signal information.

13. An improved black level clamping arrangement in accordance with claim 12 wherein said d-c blocking means is a capacitor, said gating means is a transistor and said means for charging said capacitor to said fixed d-c level comprises said transistor and further serially connected diode means and resistance means.

14. An improved black level clamping arrangement in accordance with claim 12 wherein the composite video at the output of said luminance amplifier is a negative-going signal and the horizontal fly back pulses applied to said gating means are positive-going pulses in substantial time-coincidence with the horizontal blanking portion of the composite video signal information.

15. An improved black level clamping arrangement in accordance with claim 13 wherein an adjustable resistance means is interposed between said capacitor and a source of potential for selectively controlling the charging currents as applied to said capacitor and to thereby determine the brightness level for said receiver.

* * * * *